United States Patent [19]

Nelson

[11] 4,151,551
[45] Apr. 24, 1979

[54] PROGRAMMABLE COLOR ENABLE AND SEQUENCING SYSTEM FOR SECAM

[75] Inventor: Larry A. Nelson, Hillsboro, Oreg.
[73] Assignee: Tektronix, Inc., Beaverton, Oreg.
[21] Appl. No.: 711,654
[22] Filed: Aug. 4, 1976
[51] Int. Cl.² .............................................. H04N 9/49
[52] U.S. Cl. ........................................... 358/26; 358/27
[58] Field of Search ...................... 358/14, 20, 26, 27, 358/21, 17, 18, 23, 24, 163, 183

[56] References Cited

U.S. PATENT DOCUMENTS

| | | | |
|---|---|---|---|
| 3,162,838 | 12/1964 | Sauvanet | 358/14 |
| 3,919,471 | 11/1975 | Spiessbach | 358/163 |
| 3,919,473 | 11/1975 | Cotter | 358/163 |
| 3,993,864 | 11/1976 | Pye et al. | 358/183 |

FOREIGN PATENT DOCUMENTS 2408654  1974  Fed. Rep. of Germany .............. 358/24

Primary Examiner—John C. Martin
Attorney, Agent, or Firm—Adrian J. LaRue; William D. Haffner

[57] ABSTRACT

A programmable color enable and sequencing system for a sequential color and memory television system is provided. An output for sequencing the sequential colors of the SECAM system in a decoder and enabling color if chrominance is present is generated by statistically detecting the presence of color information and, using the same statistical detector, provides for synchronization of the color sequence circuits. The statistical detection uses FM information provided during the vertical interval and/or information contained in the color subcarrier of the composite SECAM signal. Additionally, the system includes means for providing a preprogrammed color enable for each one-half line defined according to user needs or system standards for enabling instantaneous decisions about which lines of the composite signal are color. Decisions as to whether or not the overall picture is color are made by the statistical detector.

11 Claims, 12 Drawing Figures

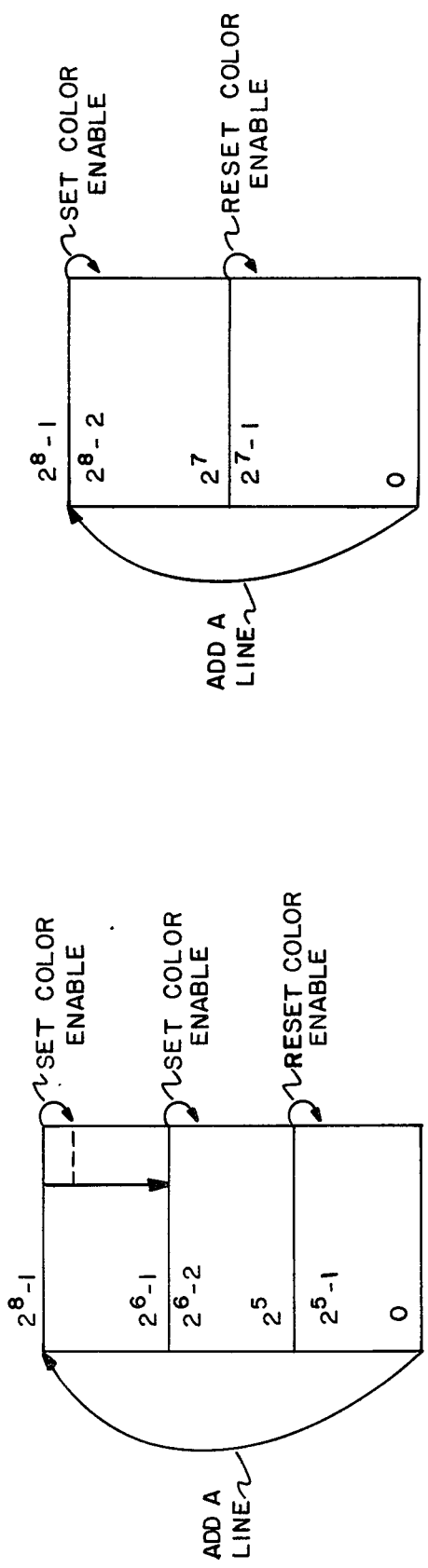
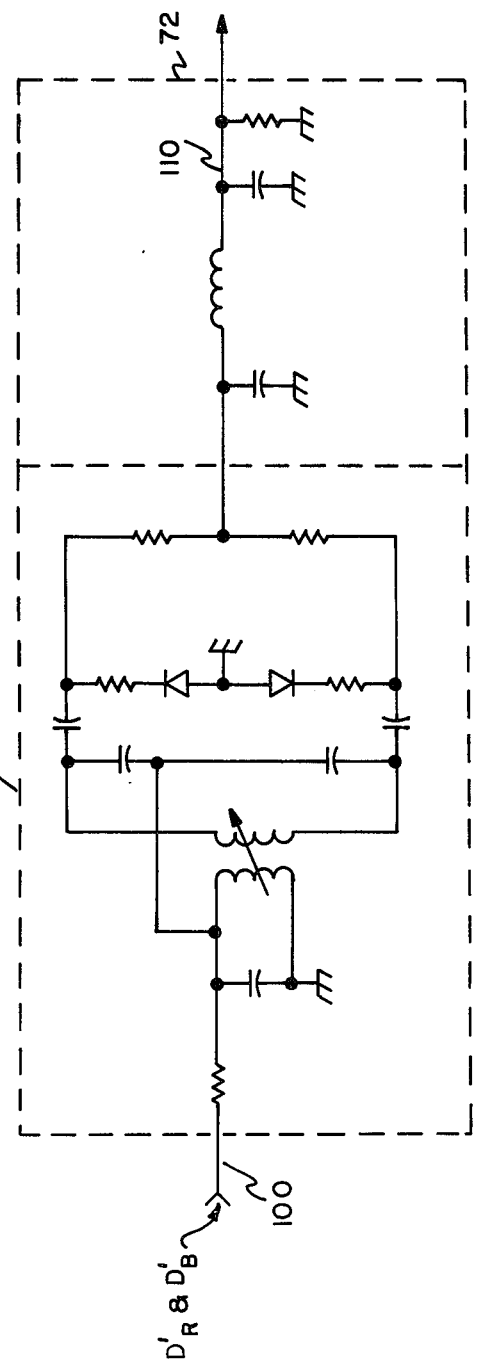

| | 00B | 01B | 10B | 11B | 00R | 01R | 10R | 11R |
|---|---|---|---|---|---|---|---|---|
| 0 | M | M | M | M | M | M | M | M |
| 1 | M | M | U | M | M | M | D | M |
| 2 | M | D | M | M | M | U | M | M |
| 3 | M | M | M | M | M | M | M | M |

PROGRAMMABLE COLOR ENABLE AND SEQUENCING SYSTEM FOR SECAM

BACKGROUND OF INVENTION

In a sequential chrominance and memory device television system, viz SECAM, the subcarrier is alternately frequency modulated by weighted chrominance signals so that the transmitted subcarrier alternates between such weighted chrominance signals; i.e., color difference signals, at the line period of 64 microseconds (1/15625Hz). The utilization of such a transmitted signal requires that the utilization device separate the luminance and subcarrier signals, then demodulate the subcarrier and matrix these signals. Because the transmitted subcarrier alternates at the line rate, the necessary second chrominance signal is received from a memory device which is storing the subcarrier received on a preceding line. A color recognition signal is radiated during each field blanking period and this color identification signal is utilized by the utilization device to synchronize a line rate switch which feeds the delayed and direct subcarrier signals to appropriate demodulators hence correct inputs to the matrix. (See "Color Television", Vol. 2, "PAL, SECAM AND OTHER SYSTEMS", first published in 1969 by Iliffe Books Ltd. for WIRELESS WORLD, copyrighted by P. S. Carnt and G. B. Townsend, 1969, pages 179-220.)

The chrominance subcarrier of the aforementioned television system can vary over a wide range of amplitude which requires, at the receiving end, a high gain limiter to maintain the output of the discriminators within the limitation of the system, which is defined as the ratio of the nominal operating voltage at the input of the decoder to the voltage corresponding to a specified percent reduction of the demodulated signal amplitude. As the noise threshold of a high gain limiter is quite low, when no signal is present at its input it is extremely difficult to determine if the system is exhibiting a poor signal-to-noise ratio or no signal at all. This, of course, produces immediate and objectionable effects which are presented the viewer of this system if a mistake is made in the determination as to whether the system is exhibiting no color signal at all or exhibiting a poor signal-to-noise ratio. Vertical line identification signals were added to SECAM to overcome this disadvantage. Proposed changes in the composite SECAM signal format (deletion of these vertical line identification signals) are reemphasizing this problem, but there has not yet been an effective solution presented.

Additionally, as previously discussed, most SECAM decoders, and encoders, utilize the color identification signal present during the vertical interval, such signals currently being phased out of the composite SECAM system thereby leaving only a white reference present on the back porch for line sequence determination and color enable. Utilizing the white reference for color synchronization, however, results in the same noise immunity problem as in detecting chrominance. Because of errors which are common to the insertion of vertical line identification signals, color synchronization based on the color subcarrier during the back porch interval may give different results than using the vertical line identification signals. Therefore, synchronization circuits of the utilization device should provide system operator flexibility for detecting color sequence by any of the above discussed methods, such circuits heretofore ineffective because the composite SECAM signal will not always meet the tolerances required.

As is also well known, numerous principles applicable to most, if not all, television systems in use today such as NTSC, PAL, SECAM, ART, NIR, etc. have been laid down. For example, in the SECAM system the chrominance subcarrier is suppressed during an interval of time, namely 5.7±0.3 microseconds, such interval of time beginning with the line suppression signal and terminating after the lead-in of the synchronization. (See "SECAM Colour T.V. SYSTEM", Imprimerie NORD-GRAPHIQUE, Paris-10°.) Such principles require complex circuits for timing, etc., thereby increasing the cost and complexity of the system.

SUMMARY OF THE INVENTION

According to the invention, a programmable color enable and sequencing system for a sequential color and memory color television system in particular, and other systems in general, is provided. Basically, using FM information provided during the vertical interval and/or information contained in the color subcarrier, using one statistical detector the system detects the presence of color information, provides an output for sequencing the sequential circuits of the SECAM system, and enables color if chrominance is present and properly sequenced. Additionally, the system includes means of providing a preprogrammed color enable for each one-half line, defined according to user needs or system standards, for enabling instantaneous decisions about which lines of the composite signal are color and to assist in making decisions as to whether or not the overall picture is color. This instantaneous decision must be made if the vertical interval is to be displayed or the display is to have no overscan otherwise the noise output of the limiters will be displayed.

Accordingly, it is an object of the present invention to provide a color enable and sequencing system for a color television system which overcomes the disadvantages of the prior art.

It is another object of the present invention to provide a color television system of stored system standards which can be preprogrammed to provide flexibility to the system.

It is yet another object of the present invention to provide a color television system having FM color sequencing and detection with statistical averaging.

It is still another object of the present invention to provide a color television system having enhanced noise immunity and improved performance for detecting chrominance pressure.

The foregoing and numerous other objects, advantages, and inherent functions of the present invention will become apparent as the same is more fully understood from the following description and drawings which describe the invention in its preferred embodiment; it is to be understood, however, that this embodiment is not intended to be exhausting nor limiting of the invention but is given for purposes of illustration in order that others skilled in the art may fully understand the invention and principals thereof and the manner of applying it in various forms, each as may be best suited to the conditions of the particular use.

DESCRIPTION OF DRAWINGS

In the drawings, wherein like numerals refer to like elements:

FIG. 6 details the circuit used for the discriminator and filter according to the FIG. 1 embodiment;

FIG. 8, including FIGS. 8A and 8B details the arithmetic organization of the counters used in the FIG. 7 circuit;

DESCRIPTION OF INVENTION

Figure 1:
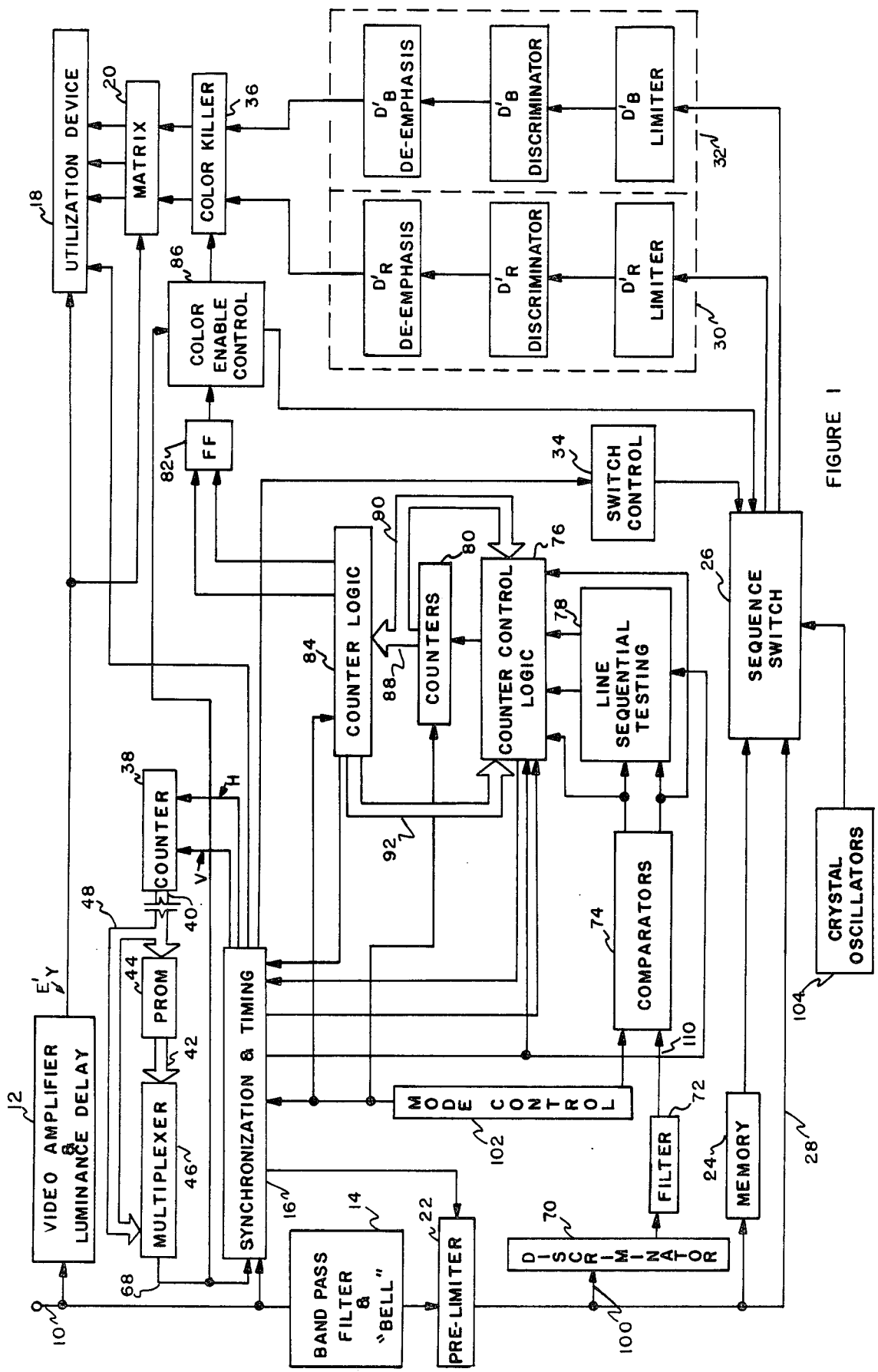
FIG. 1 is a functional block diagram of the programmable color enable and sequencing system according to the present invention.

Attention is now directed to FIG. 1 wherein there is shown, in functional block diagram form, the programmable color enable and sequencing system; e.g., a decoder, according to the present invention. Such a system, as previously discussed, finds particular usage in a SECAM system but can be utilized in systems providing, from the detection of a carrier, the information signals contained within a composite signal into intelligible language necessary for adopting such language for general use such as an image producing apparatus which may, for example, include a 3-gun cathode-ray tube; thus, the invention will be described as applied to a sequential color and memory television system.

A composite SECAM video signal is presented at an input terminal 10 and comprises a luminance signal and a subcarrier signal which is itself alternately modulated for the duration of one line, respectively by two color difference signals. Input terminal 10 is directly connected to a video amplifier and luminance delay stage 12, a band pass filter and "Bell" stage 14 and a synchronization and timing stage 16 wherein the composite signal is initially processed as follows. Band pass filter and "Bell" stage 14 separates the luminance signal from the chrominance signal (chrominance signal hereinafter referring to the subcarrier signal which is itself alternately modulated for the duration specified by the two color signals) and reestablishes the correct amplitude of the modulated subcarrier because of the opposite characteristics to that used to preemphasize the color subcarrier in an encoder. Video amplifier and delay stage 12 processes the luminance signal portion of the composite video signal to produce an output signal which is a compatible monochrome signal $E'_Y$ delayed in time to be coincident with narrow band chrominance signals passing through the remainder of the system. The compatible monochrome signal $E'_Y$ is directly applied to a utilization device 18 and to a matrix 20 to be discussed elsewhere in this description. Synchronization and timing stage 16 processes the luminance signal portion of the composite video signal to separate therefrom synchronization information, such information being, for example, horizontal blanking pulses, the vertical blanking pulses and the line and field synchronizing pulses.

The chrominance, having its modulated subcarrier reestablished to the correct amplitude by band pass filter and "Bell" stage 14 consists of two sequential FM color difference signals corresponding to the color red minus luminance $(E'_R-E'_Y)$ and the color blue minus luminance $(E'_B-E'_Y)$, hereinafter referred to as $D'_R$ and $D'_B$ where $$D'_R = -K_1(E'_R-E'_Y) \text{ and} \quad (1)$$

$$D'_B = K_2(E'_B-E'_Y). \quad (2)$$

It should be noted that the negative value of $D'_R$ is required since negative values of $E'_R-E'_Y$ give rise to positive frequency deviations when the subcarrier is modulated. Additionally, the weighting factors $K_1$ and $K_2$ give $D'_R$ and $D'_B$ values of 1 in accordance with the European Broadcasting Union (EBU) recommended color bar signal for 100% purity color with gamma-corrected signals at 75% of their maximum values. As previously mentioned, $D'_R$ and $D'_B$ are transmitted sequentially; i.e., a line of $D'_R$, where line refers to the time required between synchronization pulses, is transmitted followed by a line of $D'_B$, etc.

The signals $D'_R$ and $D'_B$ are then applied to a prelimiter stage 22 under the control of a inhibiting signal obtained from synchronization and timing stage 16 whereby they are subjected to be confined within amplitude limits as determined by the subsequent stages to prevent or minimize, say, cross-talk or other degrading characteristics well known to those skilled in the art. The prelimiter is inhibited, say, during horizontal sync time of the composite signal to present spurious noises from passing through the system. The system is also equipped with a memory 24 to continuously record the color difference signal transmitted, either $D'_R$ or $D'_B$ and repeating the one transmitted in the line before. Hence, the memory 24 can be referred to as a delay line and, using the delay, enables both $D'_R$ and $D'_B$ to be obtained simultaneously at the input of a sequence switch 26 because the sequence switch also receives a transmitted $D'_R$ or $D'_B$ directly via the line 28 which bypasses the memory 24. Memory 24 provides a time delay of exactly one scanning line; i.e., 64 microseconds.

Sequence switch 26, which can be an electronic or logic switch, is utilized by the system to route or direct $D'_R$ or $D'_B$ to a correct demodulation circuit comprising a limiter, a discriminator, and a deemphasis network. Basically, sequence switch 26 insures that $D'_R$ signals, whether coming by the delayed or direct path, always go to the $D'_R$ demodulator circuit 30 and that $D'_B$ signals go to the $D'_B$ demodulator circuit 32. Switch 26 is, in prior art systems, usually operated by an electronic or logic switch control stage 34 in accordance with line-frequency pulses or field pulses (both obtained from synchronization and timing stage 16). For example, see "Colour Television" as previously discussed.

The electronic or logic switch 26 passes the signals $D'_R$ and $D'_B$ which are limited and demodulated by conventional limiters and discriminators although the band width of the discriminators are wider than say, an NTSC demodulator. The demodulated $D'_R$ and $D'_B$ signals are then deemphasized to the inverse law used by the encoder and the gain thereof adjusted relative to the already mentioned $E'_Y$ signal. As is well known, the demodulator circuits 30 and 32 may include discriminators in the form of a phased locked loop to produce a signal which follows the incoming FM signal with its voltage controlled oscillator; the phase comparator of the phase locked loop is the error detector of the loop and, as usually constructed, produces an output voltage which is proportional to the sine of the phase difference of the voltage controlled oscillator and the incoming FM signal.

The output of the demodulation circuits are then applied via a conventional "color killer" stage 36 to the matrix 20 whereby they are combined with the signal $E'_Y$ to form not only $(E'_R - E'_Y)$ and $(E'_B - E'_Y)$ but a third color difference signal $(E'_G - E'_Y)$. These three color difference signals are applied to the utilization device 18 along with the signal $E'_Y$. Thus, if for example, utilization device 18 was a color picture tube or cathode-ray tube, the currents of the beam caused by $E'_Y$ would be proportional to the color signals corresponding to red, green and blue and a color picture will be presented.

Of course, the above-described system is a well-known Sequential Color and Memory Decoder as set forth in the already mentioned references or which can be as described in detail in U.S. Pat. No. 3,863,264 to Nelson et al. According to the invention, however, what is provided is a programmable color enable and sequencing system for the SECAM system, or with ordinary skill, the other system standards. This is provided, by adding to the prior art various means which are new and useful improvements thereof. With continued reference to FIG. 1, disposed about the synchronization and timing stage 16 is a means for providing a preprogrammed color enable for each one-half line defined according to user needs or system standards. The means enables, on a chrominance signal, an instantaneous decision about which individual lines or one-half lines of the composite signal would be color. Consideration as to whether the overall picture is color is left for a system which can employ considerable averaging. On systems utilizing other standards, the means can be encoded to any system standard relevant to the use of that standard.

Figure 2:
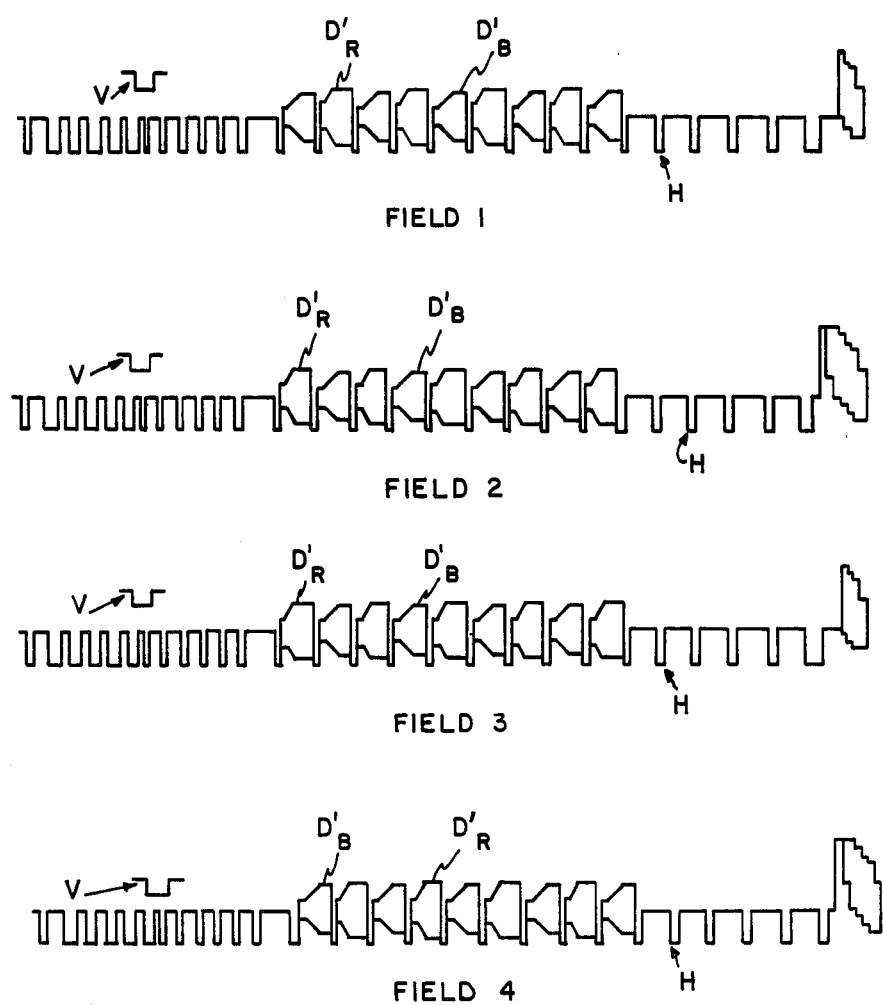
FIG. 2 details the field blanking of the composite SECAM signal.

The means just briefly discussed comprises a counter stage 38 which is responsive to outputs provided by synchronization and timing stage 16. These outputs are preferably multiples of the line rate (15,625 Hz), namely pulse trains occurring at the line rate, hereinafter referred to as H, and vertical pulse trains occurring every 312.5 lines; i.e., 20 milliseconds, hereinafter referred to as V. These above-mentioned H and V pulses and other pulses as well as SECAM sequencing signals are detailed in FIG. 2 wherein is shown the SECAM field blanking details. As can be discerned from this figure, the vertical pulse train duration is started on the last segment of the serrated vertical sync pulse of the field blanking interval and alternates between starting on a one-half line for fields one and three and starts on a full line for fields two and four. As the generation of the H and V signals are well known, no detailed discussion thereof is believed necessary. Counter stage 38 comprises a plurality of of 4-bit binary counters for providing on an N-bit address bus 40 a plurality of N-M bit PROM address data words and on an M-bit address bus 48 an M-bit multiplexer address data word. Responsive to the N-M bit PROM address data words is a programmable read only memory, PROM 44. PROM 44 provides for stored system standards on firmware which can be programmed to provide flexibility to the system. The data stored in PROM 44 is then read out via a $2^m$ bit data bus 42, serialized using a multiplexer stage 46 keyed by the low ordered bits on bus 48; i.e., the least significant bits, of counter stage 38 via the address bus 48. The output of multiplexer stage 46 is then applied to the synchronization and timing stage 16, the purpose of which will be discussed later in the description, and to the "color killer" stage 36 via a color enable control stage, to be discussed elsewhere, to enable chrominance to be passed to the matrix 20 only during lines associated with color. Thus, it can be seen that the PROM 44 is used to program, according to user standards, the television lines which will contain color information as indexed according to each one-half line of a composite signal which is being decoded and utilized. It should be mentioned that the preferred embodiment operates according to each one-half line of the composite video signal. This does not preclude, however, that the circuit operate at less that the half-line rate or at more than the half-line rate. Thus, there has been described a unique method of providing a preprogrammed color enable for each half line defined according to system standards or user needs.

Figure 3:
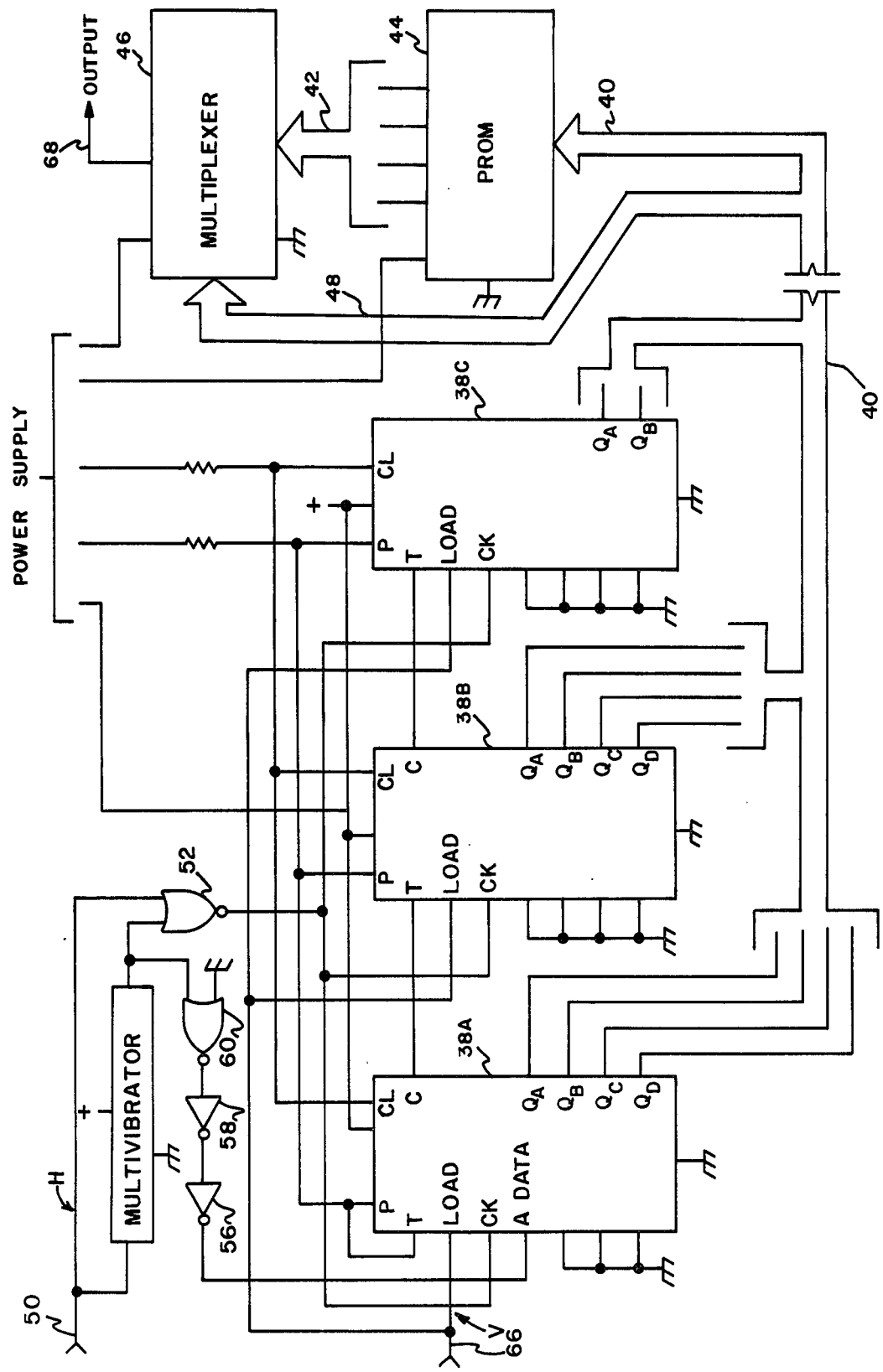
FIG. 3 is a circuit for the one-half line programmable color enable for the system shown in FIG. 1.

The method just described can be generalized to preprogram any number of portions of a line either statically or on an active basis. Frequently, however, all that is required is a color enable which enables the one-half line present at the beginning and end of every other field together with the remaining active color lines. The amount of storage and associated multiplexing and addressing can be reduced if one-half line of every other field is not absolutely necessary. This constitutes an improvement in cost, in complexity and in physical size. Such an embodiment is shown in FIG. 3. Referring now to FIG. 3, there is shown the counter 38, PROM 44 and multiplexer 46 in detail. As can be discerned, three 4-bit binary counters, which are preferably commercially available 74S163 integrated counters, are simultaneously clocked (input CK) by the H pulse applied via an input 50. A NOR gate 52 provides for the correct polarity of the clock signal as well as enabling the counters to be clocked by a 31250 Hz pulse train obtained by triggering a commercially available 96L02 integrated multivibrator by the H pulse simultaneously applied thereto. This 31250 Hz pulse train is also used as the A data input of a first counter 38A which is applied thereto via a plurality of delay means comprising two inverters 56, 58, and a NOR gate 60 having one input grounded. Each counter, including second and third counters 38B and 38C is simultaneously loaded by the V pulse applied via another input 66. In operation, the counter is connected such that on fields 1 and 3, the counter is preset to a count of one; i.e., 000000000001 where the right-most 4-bits corresponds to the outputs $Q_A$, $Q_B$, $Q_C$, and $Q_D$ of counter 38A, where the center-most 4-bits correspond to the outputs of counter 38B and the left-most 4-bits correspond to the outputs of counter 38C. Thus, in field 1 or 3, only $Q_A$ of counter 38A will be set to a high level. It should be noted that the $Q_C$ and $Q_D$ outputs of counter 38C are not used because PROM 44 is only an 8-bit address. In fields 2 or 4. the counter is preset to a count of zero; i.e., 000000000000. After the counters are preset, the address of each line is strobed into PROM 44 which is preferably a commercially available 82S129 integrated circuit. The data stored in PROM 44 must be converted to serial form in order to arrive at a single signal containing the desired programmed color enable. In other words, PROM 44 stores information in a word format and the color enable control 86 requires information (control signals) in a single bit format. The four-bit words are converted to individual bits by multiplexer 46 which is a 74S153 integrated circuit. Since, as mentioned above, PROM 44 is 256×4 array, the least significant bits of the counter; i.e., counter 38A outputs $Q_A$ and $Q_B$ can select any bit within the array to be applied via the output line 68, one bit after another.

Figure 4:
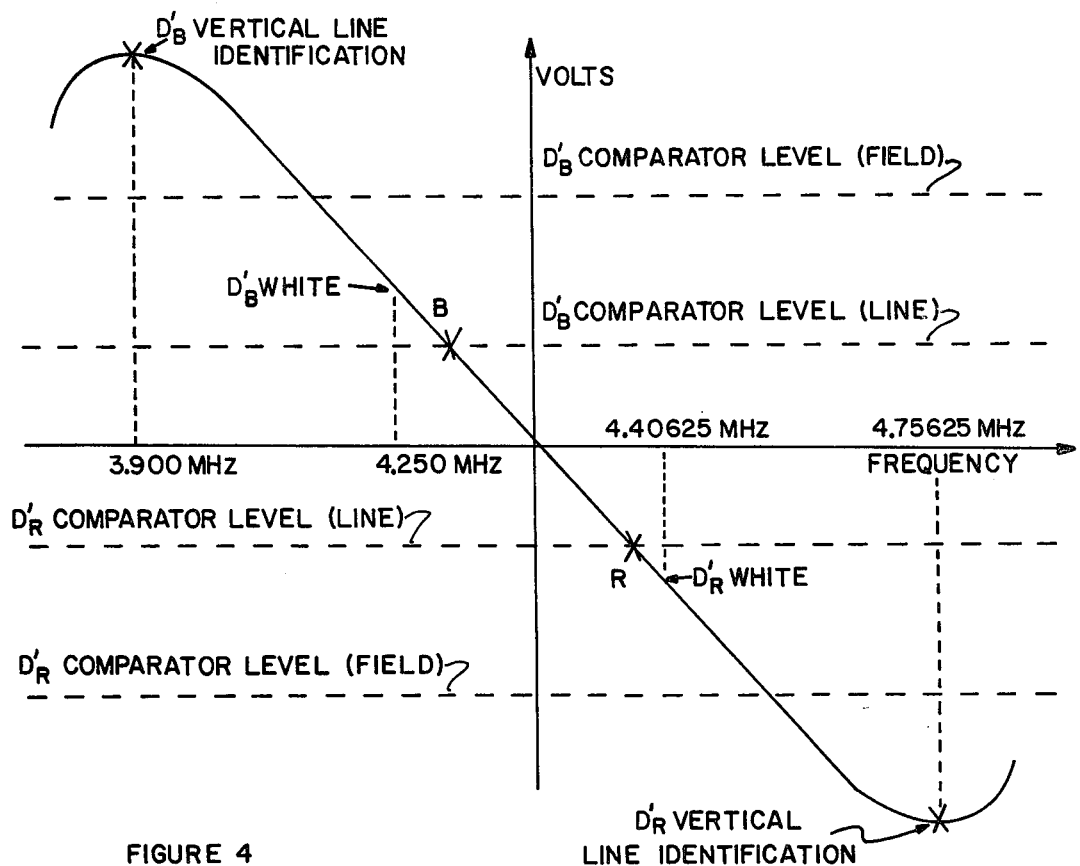
FIG. 4 details the output characteristics of a discriminator used for the means to statistically detect the presence of color information according to the present invention.
Figure 5:
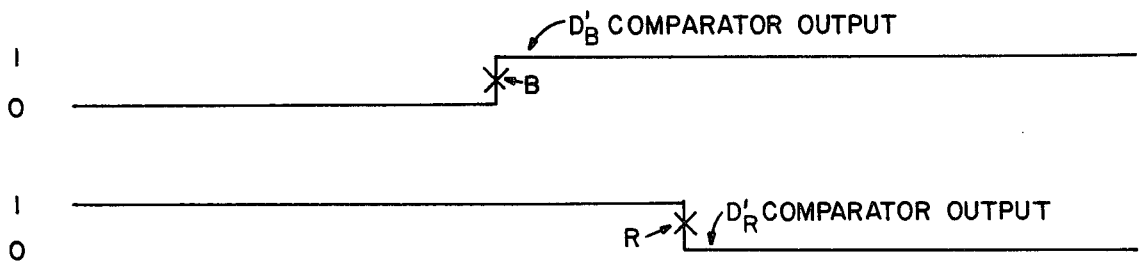
FIG. 5 details the digitally encoded output of the discriminator whose output characteristics are in accordance with FIG. 4.

Continuing, it was also stated in the abstract of the invention that a means is provided to statistically detect the presence of color information and, using that statistical information, provide for synchronization of the color sequence circuits. The detection uses FM information provided during the vertical interval (see FIG. 2) and/or information contained during backporch time of the composite SECAM signal (not shown, but well known). As is also well known and stated previously, the chrominance subcarrier of the SECAM signal can vary over a wide range of amplitude and high gain limiters must be utilized by the prior art systems. Since a high gain limiter produces noise when no signal is present, detection as to having a poor signal-to-noise ratio or no signal at all is hard to establish. Additionally, most SECAM decoders use the sequencing method based upon the line identification signals present during the vertical interval (See FIG. 2) or an external synchronizing signal. To overcome these disadvantages, a discriminator 70, is operatively disposed to receive the sequential, anticompensated and limited $D'_R$ and $D'_B$ signals. Discriminator 70 whose typical output characteristics are shown in FIG. 4 can be nonlinear, distorted and extremely band limited as compared to the discriminators in demodulator circuits 30 or 32, such discriminator simply providing a positive output when one white reference and/or vertical line identification signal is decoded, say $D'_B$, and a negative output when the other white reference and/or vertical line identification signal, say, $D'_R$ is decoded. The output of the discriminator 70 is fed to comparators stage 74 which digitally encodes the output of discriminator 70 as shown in FIG. 5. A filter 72, disposed between the discriminator and comparators is utilized to limit any noise to about 700 KHz. This encoded signal is logically decoded by a counter control logic means 76 to determine whether the color present is the proper color for that line and whether it is of sufficient discriminated amplitude to be a reliable signal after insurance of proper sequencing via a line sequential testing stage 78.

To enhance the noise immunity and improve the performance of the circuit, a counter 80 is incorporated as a digital integrator. The counter is clocked whenever the output of the comparators are relevant and basically counts up if the colors are sequenced properly and sets a color enable flip-flop 82 via a counter logic stage 84 to disable the color killer stage 36; counts down if the colors are reversed in sequence and adds another line so that when enabled, the colors are properly matrixed; or counts towards the center of the counter and resets the flip-flop 82 to disable color if the discriminated chrominance signal becomes noisy. Integration of the signal is controlled by the size of the counter. The amount of hysteresis can be selected as desired. The counter control logic 76, counter 80, and counter logic stage 84 are all interconnected; it will suffice at this point to indicate such interconnections by the bus lines 88, 90, and 92. These interconnections will be fully described later in this specification.

Also shown on the FIG. 1 embodiment is a mode control 102 which functions to control the statistical detection of the presence of color information by selecting the comparator levels and controlling the feedback around the counter according to the configurations depicted in FIGS. 8A and 8B to be taken up later in this specification. Also shown is an oscillator stage 104, preferably a crystal controlled oscillator stage, which is necessary when there is no incoming chrominance subcarrier signal and insures that the circuits 30 and 32 always receive subcarrier. These crystal frequencies provides means for clamping the output of the discriminators to a designated level, white, as is well known.

Figure 7A:
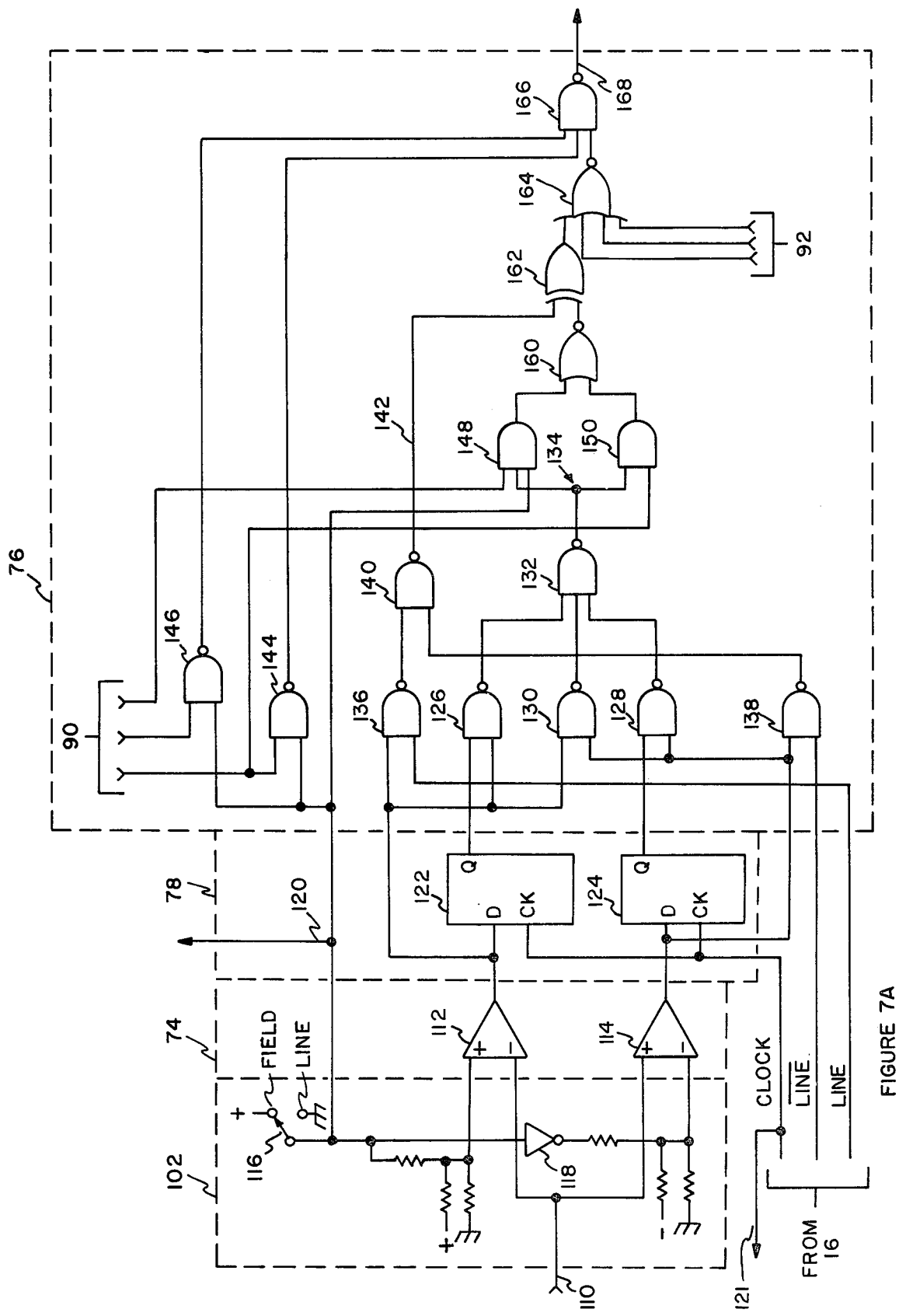
FIG. 7, including FIGS. 7A and 7B, details the circuit used for the statistical detector according to the FIG. 1 embodiment.

Attention is now directed to FIG. 6 wherein is shown the discriminator 70 and filter 72. The limited color signals $D'_R$ and $D'_B$ are obtained from the prelimiter 22 and applied to the discriminator via the line 100. Discriminator 70 and filter 72 are conventional circuits and as such no circuit component values have been listed. These two circuits are, for example, as shown and described in a SONY ® service manual for the model KV-1220DF TRINITRON ® COLOR TV. The filter 72, for the preferred embodiment, is band limited to about 700 kilohertz to suppress most of the noise passing through the discriminator 70. The output of the filter 72 is then applied to the comparators stage 74 via the line 110. Comparators stage 74 as well as the line sequential testing stage 78, counter control logic stage 76, counter stage 80, control logic stage 84, and flip-flop 82 are shown in detail in FIGS. 7A and 7B. Also shown is the mode control 102.

The amplitude and bandwidth limited signals obtained from stages 70, 72 are next applied to the comparators stage 74 via line 110. Line 110 is directly connected to the inverting (minus) and noninverting (plus) inputs of a pair of preferably LM311 comparators 112 and 114 respectively, whereas the noninverting and inverting inputs of the same comparators are coupled to the mode control 102. Mode control 102 includes, say, switch 116, a plurality of level resistors (not numbered) and an inverter 118. In a first position of the switch 116 (field, as shown), the amplitude and bandwidth limited signals via line 110 are compared to a higher magnitude DC level than when the switch is in the second (line) position thereby permitting the comparators to digitally encode the output of the discriminator 70 using different references and provides a means of providing an output of constantly changing logic which only has meaning during white lead in on lines which have chrominance information and on vertical line identification signals. A typical application of this switch would be to increase the magnitude of the compared DC level when identification of color sequence is based only on the vertical line identification signals. This would take advantage of the increased signal-to-noise ratio available. It should be noted that switch 116 could be a logic, electronic, or mechanical switch means. It should also be noted that the outputs from the mode control 102 are applied to other portions of the circuits via the line 120 and will be used, for example, to adjust the effective size of the already mentioned counters 80 as shown in FIGS. 8A and 8B to be described elsewhere in the specification.

To determine whether the $D'_R$ and $D'_B$ signals are properly sequenced, the output of the comparators 112, 114 are applied to the D inputs of a pair of preferably 74LS74 flip-flops 122 and 124 as well as the counter control logic stage 76. Each D flip-flop is strobed, clocked, depending on whether line time or field time information is being used for color enable and sequencing and such clock is obtained from the synchronization and timing stage 16. (Two or more clock pulses per counter line or vertical line identification signals are possible, but are not used in the preferred embodiment.) The Q output of each flip-flop is NANDed together with the D input to such flip-flop via NAND gates 126 and 128 and the D input of each flip-flop is NANDed together via a NAND gate 130. The outputs of NAND gates 126, 128, and 130 are NANDed together via NAND gate 132 and produce at a junction 134 a control signal to cause the counter 80 to count to the middle value of the counter when color is not present. As can be discerned from the diagram, if the D and Q inputs and outputs of the flip-flops 122 or 124 are identical, the signal from prelimiter 22 is not sequential.

Additionally, the D input of each flip-flop 122 and 124 is coupled to a pair of NAND gates 136 and 138 whereby they are NANDed together with complementary signals obtained from the synchronization and timing stage 16, and after NANDing the outputs of NAND gates 136 and 138 together via another NAND gate 140 provides on the line 142 a second counter control signal for causing the counter to count up or count down accordingly to the comparator outputs and the assumed color sequence (line and $\overline{\text{line}}$). Thus, the signal at the terminal 134 will force the counter to the middle value of the counter because of (1) the $D'_B$ or $D'_R$ is not sequential or (2) the amplitude of the signals from the discriminator is not of sufficient amplitude. The signal at the line 142 will cause the counter to count up if $D'_R$ and $D'_R$ are sequenced properly or cause the counter to count down if the sequence is reversed.

A plurality of NAND gates 144, 146, and an AND gate 148 are provided to insure that the counters 80 are properly organized and are operated in accordance with the counter organization tables as shown in FIGS. 8A and 8B. As previously stated, when the switch 116 of mode control 102 is in the position shown, the system is operated on the vertical identification signals occurring during the vertical interval. As can be discerned from the vertical interval detail diagram, (see FIG. 2) each field normally includes only 9 line identification signals. Because the amount of data is greatly reduced when only these signals are used for color sequence and enable, the counter averaging must be less or an excessive time will be used to accomplish the circuits task. This is accomplished by NANDing together the signal on line 120 under the control of switch 116 and signals via data line 90, corresponding to the counter states of $2^7$, $2^6$, and $2^5$ respectively, by NAND gates 144, 146, and AND gate 148. In the second position of the switch 116 the gates 144, 146, and 148 are inhibited and an AND gate 150 sets the counter organization in the mode shown in FIG. 8B. The output of AND gates 148 and 150 are then ORed together in a NOR gate 160 and the output thereof is exclusively ORed with the signal on line 142 via an exclusive OR gate 162, the output of which is ORed together with data from the counter logic 84 via the data line 92, such data line defining counter outputs corresponding to counts of $2^6-1$, $2^8-1$ and an underflow signal to be discussed shortly. These signals are NORed together via a NOR gate 164. The output of NOR gate 164, NAND gates 144 and 146 are NANDed together via a NAND gate 166 and produce on the line 168 the counter data input signal to control the counter in accordance with the counter organization as shown in FIG. 8A or 8B depending upon the setting of the switch 116.

Figure 7B:
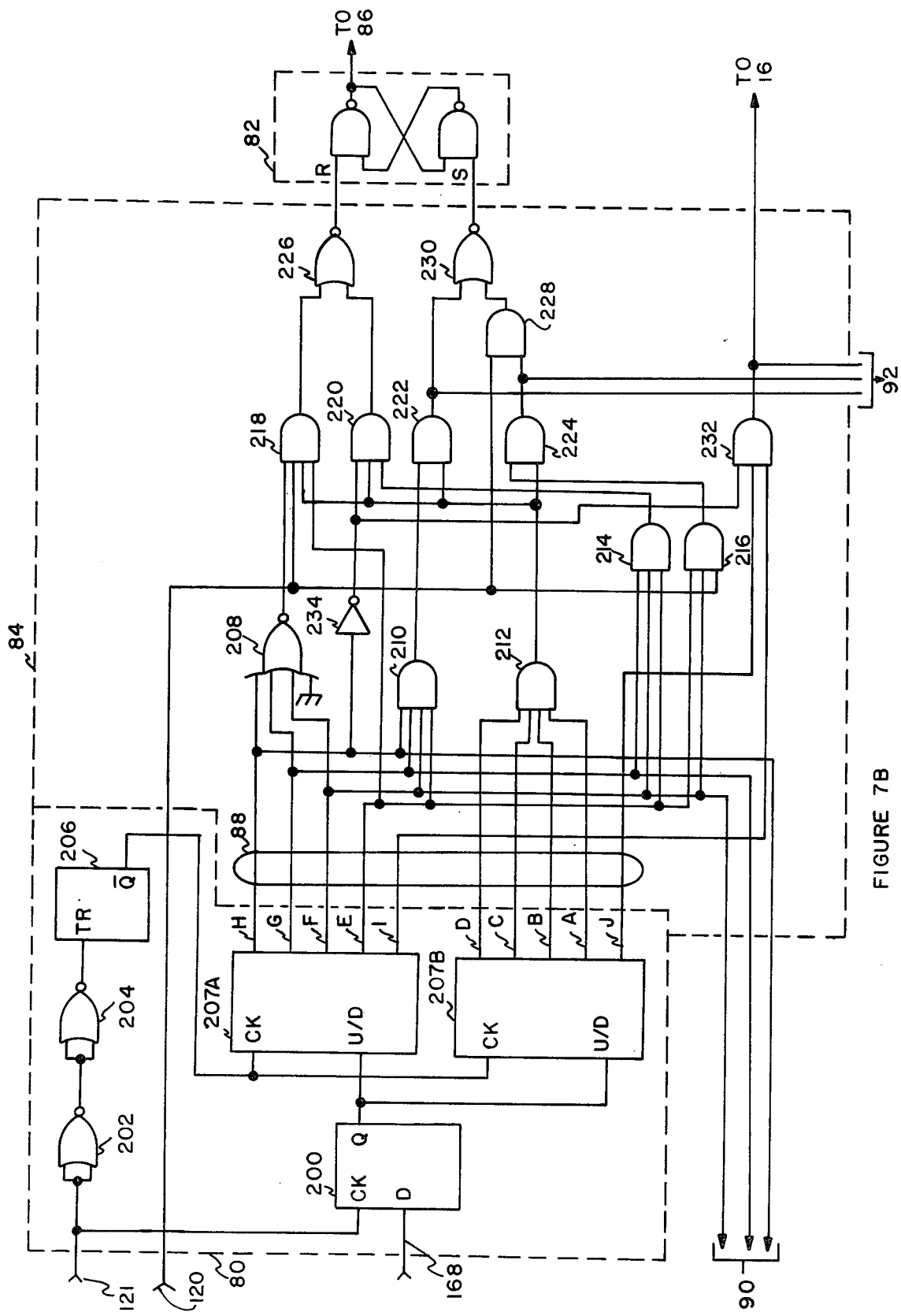

Referring now to FIG. 7B, there is shown the counters 80, counter logic 84, and flip-flop 82. The just discussed counter control signal on the line 168 is applied to the D input of a preferably 74LS74 flip-flop 200. The flip-flop 200 is clocked by the same clock signal as previously discussed with regard to FIG. 7A which is available on the line 121. This clock is delayed via NOR gates 202 and 204 for toggling a multivibrator 206, which is preferably a 96L02, to produce on the Q output thereof a delayed clock pulse to clock the actual counters whereas the Q output of the flip-flop 200 prevents the up/down toggling of the actual counters when the clock is at a low level. The flip-flop and multivibrator are only needed because of the parameters of the particular integrated circuits used for the counter, whose actual implementation requires that the up/down control not change when the clock is in a low state. The actual counter comprises a pair of 74LS141 counters 207A and 207B for providing on the data bus 88 signals on the lines A, B, C, D, E, F, G, and H, representing counter states $2^0$; $2^1$; $2^2$; $2^3$; $2^4$; $2^5$; $2^6$; $2^7$, and on the lines I and J a pair of signals which represents the maximum and minimum value of the counter. This last mentioned pair of minimum and maximum counter value pairs are used to steer the counters in accordance with the counter organization tables as shown in FIGS. 8A and 8B. The signals on the lines A through H are then logically combined via NOR gate 208 and AND gates 210, 212, 214 and 216, the outputs of which are ANDed together via AND gates 218, 220, 222, and 224. The outputs from the AND gates 218 and 220 are ORed together via a NOR gate 226 to provide the reset input (R) to the flip-flop 82 whereas the output signals of the AND gates 222 and 224 are logically combined via AND gate 228 and NOR gate 230 to form the set input (S) of the flip-flop 82; flip-flop 82 comprising two cross connected NAND gates, such circuit well known to those skilled in the art. The output of the gates 222, 224, and 232 form the signals in data bus 92 comprising the signals $2^6-1$, $2^8-1$ and the underflow signal. In addition, the underflow signal, derived at the output of NAND gate 232 is applied to the synchronization and timing stage 16 for causing the line and $\overline{\text{line}}$ inputs shown in FIG. 7A to switch the sequence switch 26 in accordance with the incoming signal. The pair of signals on the lines I and J are derived by counters 207A, B and combined with the signal via the inverter 234 by AND gate 232 to indicate the counter is ready to underflow on the next count. The counter control logic 76 then causes the up/down counter control line to a logical 1 which causes the counter to count down, finishing the underflow condition. In this way, the color sequencing is reversed and color is enabled all at once, whereas the counter would have otherwise counted to zero, reversed the color sequence, then had to count all the way up until color was enabled. This speeds the color sequencing and enabling operation without sacrificing noise immunity.

The above described operation of counters 80 is best understood by reference to FIGS. 8A and 8B as was mentioned earlier in the specification. These two figures detail the arithmetic organization of the counters when switch 116 is in the Field and Line modes, respectively. In the latter position, the information contained in the white reference subcarrier present during the back porch of each SECAM line is used to sequence the color difference signals and enable color whenever a discriminable FM color signal is present. FIG. 8B, therefore shows a representation of the counter states where the various counts possible are shown in ascending order and where control loops are keyed off particular counts in a line mode. In this mode, inputs to the counter 80 are received during every active picture line based upon the white-reference which reoccurs about every 64 μsec, excluding the vertical interval, and since it is of very low amplitude and is subject to aberrations in amplitude and timing, a large amount of averaging is required.

When a monochrome input signal is present, the counter will count between $2^7$ and $2^7-1$ on alternate lines (shown as a loop "RESET COLOR ENABLE"). On each count of $2^7-1$ the flip-flop 82 resets. Should a color signal suddenly become available, the counter will either count up or count down depending upon color sequencing. In either case, color would remain disabled until the next loop (SET COLOR ENABLE) is reached. Assume, for example, that the system and input signals were sequenced properly. The counter reaches $2^8-1$ which would set flip-flop 82. On the next input, the counter would be forced to count down one count to $2^8-2$, thereby preventing an overflow condition. On succeeding counts, the counter would count alternately between $2^8-1$ and $2^8-2$ and each time $2^8-1$ was reached the flip-flop 82 would be set. If noise were encountered on a few lines, the counter would count down for a short period; but if $2^7-1$ were never reached, color would remain enabled. This hysteresis prevents color enable errors due to noise and/or signal aberrations as previously discussed.

Now, suppose the color signal sequence were to suddenly reverse. The counter would count downward continuously. As it passed $2^7-1$ the display would become monochrome i.e., flip-flop 82 reset to disable color. When the counter reaches a count of 0 it would underflow thereby causing the switch control 34 (See FIG. 1) to correct the sequence. At the same instant, the count of the counter would become $2^8-1$ (result of underflow) thus setting the color enable flip-flop to color once again.

Concerning FIG. 8A, which is the organization of the counter when Field mode is selected, since only 9 counts ae received during each vertical interval, and on two fields out of four, these counts are not in proper sequence, considerably less averaging can be employed. Fortunately less averaging is necessary because of the higher deviation of the Field Identification signals at the input to the discriminators and consequent high levels into the comparators. To understand the counter operation in Field mode, assume the system is operating on a monochrome picture. The counter will be counting alternately between $2^5$ and $2^5-1$. Each time the count of $2^5-1$ is received, the color enable flip-flop 82 will be reset. Now assume a color picture is received and it is in sequence with the system. The counter will count up as it did in Line mode, but will stop counting at $2^6-1$. It will, in fact, be forced to count down to $2^6-2$ and will thereafter loop as shown. Each time $2^6-1$ is reached, the color enable flip-flop will be set. If a reverse sequence were received, the counter would count down until it underflows exactly as in the Line mode. After the underflow, the counter will be at $2^8-1$; a condition which cannot be reached by counting up in this mode. Nevertheless, the flip-flop will be set as before but now, the counter will be forced (regardless of the incoming color signal) to count down to $2^6-1$. This is, of course, to decrease the reaction time of the circuit should a change in the incoming signal occur later. The counter will then count between $2^6-1$ and $2^6-2$ as was previously explained.

Figures 9, 10:
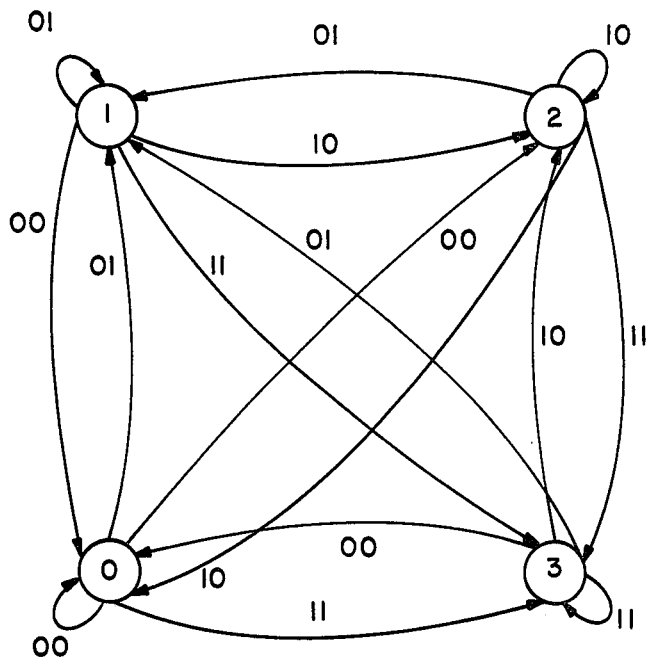
FIG. 9 is a state diagram of the logic used to drive the up/down counter control line in the FIG. 7 circuit.
FIG. 10 is an excitation table for operation of the up/down counter control line used in the FIG. 7 circuit.

Referring now to FIGS. 9 and 10 there is shown a state diagram and excitation table for the operation of the counter control line. As is the norm, these two figures are well understood by those skilled in the art and completely describes the up/down counter control line logic in the FIG. 7B embodiment. However, for those interested or for those unfamiliar with state tables and diagrams, reference should be made to "Computer Logic Design" by M. Morris Mano, copyrighted 1972 by Prentiss-Hall, Inc. Also, in FIG. 10, the letters M, U, and D correspond to the following: M indicates count toward middle; D indicates count down; and U indicates count up. Additionally, the numerals 0, 1, 2, 3, and 4 on the left hand side of the excitation table identify the flip-flop line sequence testing whereas the numerals associated with a letter across the top of the table define the comparator inputs with an assumed color line ($D'_B=B$, $D'_R=R$).

While there has been shown and described the preferred embodiments of the present invention, it will be apparent to those skilled in the art that many modifications may be made thereon for the use thereof. For example, the circuit of the subject invention is conveniently done "digitally", but the concepts could be utilized using analog circuit techniques such as, for example, a strobed integrator for a counter, etc. Therefore, the appended claims are intended to cover all changes and modifications that fall within the true spirit and scope of the invention.

The invention is claimed in accordance with the following:

1. Programmable control means for a color television system, comprising:
   programmable memory means for storing addressable bits of information therein which represent selected data corresponding to color standards;
   means for converting signal portions contained within a composite video signal of the system into timing signals;
   counter means responsive to said timing signals for providing address signals to said programmable memory means for selecting said addressable bits of information; and
   means coupled to said programmable memory means for serializing said addressable bits of information received therefrom to provide an output control signal to the system.

2. The control means according to claim 1 wherein said programmable memory means defines a read only memory.

3. The control means according to claim 1 wherein said means coupled to said programmable memory means defines a multiplexer that selects from $2^m$ input lines to provide said output control signal on a single output line.

4. The control means according to claim 3 wherein said multiplexer includes a set of selection lines also responsive to said address signals.

5. Sequence control and chrominance enable means for a television system, comprising:

means for extracting the chrominance portion of a modulated video signal applied to the system;

means for comparing said chrominance portion with a reference signal to provide first and second digital signals;

means for processing both said first and said second digital signals to provide an output signal which represents sequencing information of said chrominance portion;

means for averaging said output signal; and means responsive to the averaging of said output signal for providing a sequence control signal and an enable control signal to the system.

6. The sequence and enable means according to claim 5 wherein said means for comparing includes means for selecting said reference signal so that said first and said second digital signals are provided at the system line rate or at the system field rate.

7. The sequence and enable means according to claim 6 wherein said first and said second digital signals provided at the system line rate define the subcarrier lead-in signal.

8. The sequence and enable means according to claim 6, wherein said first and said econd digital signals provided at the system field rate define vertical interval signals.

9. The sequence and enable means according to claim 5 wherein said means for processing includes digital means for testing said first and said second digital signals to provide said sequencing information.

10. The sequence and enable means according to claim 5 wherein said means for averaging defines a digital integrator.

11. A programmable color enable and sequencing system for a Sequential Color and Memory and Television System signal, comprising:

programmable memory means for storing addressable bits of information therein which represents selected data corresponding to the television system signal standards;

means responsive to the signal for providing first signals corresponding to timing information contained within the signal and also providing second signals corresponding to chrominance information contained within the signal;

counter means responsive to said first signals for providing address signals to said programmable memory means for selecting said addressable bits of information;

means coupled to said programmable memory means for serializing said addressable bits of information received therefrom to provide an enable control signal to the system;

means for comparing said second signals with a reference signal to provide first and second digital signals;

means for processing both said first and said second digital signals to provide an output signal which represents sequencing information of said second signals;

means for averaging said output signal; and means responsive to the average of said output signal for providing a sequence control signal and an additional enable control signal to the system.

* * * * *